United States Patent
Lee et al.

(10) Patent No.: US 8,571,593 B2
(45) Date of Patent: Oct. 29, 2013

(54) APPARATUS AND METHOD FOR UPLINK POWER CONTROL IN WIRELESS COMMUNICATION SYSTEM

(75) Inventors: Sung-Ho Lee, Seoul (KR); Keun-Chul Hwang, Yongin-si (KR); Yong-Seok Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 852 days.

(21) Appl. No.: 12/607,581

(22) Filed: Oct. 28, 2009

(65) Prior Publication Data

US 2010/0113077 A1    May 6, 2010

(30) Foreign Application Priority Data

| Oct. 31, 2008 | (KR) | ........................ 10-2008-0107467 |
| Mar. 31, 2009 | (KR) | ........................ 10-2009-0027415 |
| Apr. 24, 2009 | (KR) | ........................ 10-2009-0035849 |

(51) Int. Cl.
*H04B 7/00* (2006.01)
*H04B 1/00* (2006.01)
*H04B 17/00* (2006.01)

(52) U.S. Cl.
USPC ........ 455/522; 455/69; 455/127.1; 455/67.13

(58) Field of Classification Search
USPC ........................................ 455/522, 69, 127.1
See application file for complete search history.

(56) References Cited

U.S. PATENT DOCUMENTS

| 5,590,409 | A | * | 12/1996 | Sawahashi et al. ............ 455/69 |
| 5,852,782 | A | * | 12/1998 | Komatsu ........................ 455/522 |
| 6,097,703 | A | | 8/2000 | Larsen et al. |
| 6,334,047 | B1 | * | 12/2001 | Andersson et al. ............ 455/69 |
| 6,493,541 | B1 | * | 12/2002 | Gunnarsson et al. ........... 455/69 |
| 6,697,634 | B1 | * | 2/2004 | Hayashi ........................ 455/522 |
| 7,542,530 | B2 | * | 6/2009 | Cho et al. ...................... 375/345 |
| 7,574,179 | B2 | * | 8/2009 | Barak et al. .................... 455/101 |
| 7,620,370 | B2 | * | 11/2009 | Barak et al. ................. 455/67.13 |
| 7,778,217 | B2 | * | 8/2010 | Lee et al. ...................... 370/328 |
| 7,801,075 | B2 | * | 9/2010 | Lim et al. ...................... 370/329 |
| 7,826,417 | B2 | * | 11/2010 | Yang et al. .................... 370/329 |
| 7,885,678 | B2 | * | 2/2011 | You et al. ...................... 455/522 |
| 7,899,486 | B2 | * | 3/2011 | You et al. ...................... 455/522 |
| 7,933,195 | B2 | * | 4/2011 | Kim et al. ..................... 370/204 |
| 8,023,897 | B2 | * | 9/2011 | Cho et al. ..................... 455/63.1 |
| 8,165,245 | B2 | * | 4/2012 | Park et al. ..................... 375/297 |
| 2003/0148769 | A1 | * | 8/2003 | Chi et al. ...................... 455/453 |
| 2004/0106371 | A1 | | 6/2004 | Agin |
| 2005/0130690 | A1 | | 6/2005 | Shinozaki |

(Continued)

FOREIGN PATENT DOCUMENTS

| CN | 101123601 A | 2/2008 |
| CN | 101192860 A | 6/2008 |
| CN | 101247170 A | 8/2008 |
| KR | 10-2007-0076678 | 7/2007 |
| KR | 10-2007-0076678 A | 7/2007 |
| KR | 10-2007-0109654 | 11/2007 |
| KR | 10-2007-0109654 A | 11/2007 |
| RU | 2 249 916 C2 | 4/2005 |
| WO | 2008/004811 A1 | 1/2008 |
| WO | 2008/115660 A1 | 9/2008 |

*Primary Examiner* — Tilahun B Gesesse
(74) *Attorney, Agent, or Firm* — Jefferson IP Law, LLP (57) ABSTRACT

An apparatus and method for controlling a transmit power of a sounding signal in a wireless communication system are provided. The method includes estimating a downlink Carrier to Interference and Noise Ratio (CINR) using at least one signal received from a Base Station (BS), determining a transmit power level for a sounding signal using a target CINR for the sounding signal, wherein the target CINR is determined based on the downlink CINR and multi-target CINR information, and transmitting the sounding signal according to the transmit power level.

30 Claims, 9 Drawing Sheets

(56) References Cited

U.S. PATENT DOCUMENTS

| | | |
|---|---|---|
| 2005/0201295 A1* | 9/2005 | Kim et al. .................... 370/241 |
| 2007/0191050 A1 | 8/2007 | Chang et al. |
| 2007/0265026 A1* | 11/2007 | You et al. .................... 455/522 |
| 2008/0009322 A1* | 1/2008 | Kim .......................... 455/562.1 |
| 2008/0056220 A1* | 3/2008 | Yu et al. ...................... 370/342 |
| 2009/0213961 A1* | 8/2009 | Park et al. .................... 375/297 |
| 2010/0113077 A1* | 5/2010 | Lee et al. ..................... 455/501 |
| 2010/0331036 A1* | 12/2010 | You et al. ..................... 455/522 |
| 2011/0111766 A1* | 5/2011 | Yang et al. ................. 455/452.2 |
| 2011/0300895 A1* | 12/2011 | Tsuruoka ..................... 455/522 |

* cited by examiner

APPARATUS AND METHOD FOR UPLINK POWER CONTROL IN WIRELESS COMMUNICATION SYSTEM

PRIORITY

This application claims the benefit under 35 U.S.C. §119(a) of a Korean patent application filed in the Korean Intellectual Property Office on Oct. 31, 2008 and assigned Serial No. 10-2008-0107467, a Korean patent application filed in the Korean Intellectual Property Office on Mar. 31, 2009 and assigned Serial No. 10-2009-0027415 and a Korean patent application filed in the Korean Intellectual Property Office on Apr. 24, 2009 and assigned Serial No. 10-2009-0035849, the entire disclosures of all of which are hereby incorporated by reference.

BACKGROUND OF THE INVENTION

1. Field of the Invention

The present invention relates to a wireless communication system. More particularly, the present invention relates to an apparatus and method for controlling transmission power of an uplink sounding signal in a wireless communication system.

2. Description of the Related Art

A conventional communication system has been developed with a focus on a voice call service. Recently, communication systems are being developed in order to provide data service and various multimedia services, in addition to the voice call service. However, since the conventional communication system provides only the voice call, the conventional communication system has a narrow bandwidth and expensive fees, and does not satisfy increased demands of users. Additionally, due to developments in the communication industry and user demands for Internet service, a need for an efficient communication system that provides Internet service has significantly increased. Accordingly, a broadband wireless communication system has been considered for efficiently providing Internet service.

The broadband wireless communication system is based on Orthogonal Frequency Division Multiplexing/Orthogonal Frequency Division Multiple Access (OFDM/OFDMA) and is able to archive a fast data transmission by transmitting signals using a plurality of sub-carriers in a physical channel. A radio access scheme of the broadband wireless communication system is being standardized in an Institute of Electrical and Electronics Engineers (IEEE) 802.16 standard.

In the broadband wireless communication system based on the OFDM/OFDMA, higher uplink transmit power causes interference to other terminals and adjacent cells, and lower uplink transmit power decreases a received power of a Base Station (BS). Accordingly, power control is needed to satisfy required Carrier to Interference and Noise Ratio (CINR) in which research to find an effective uplink power control scheme is presently ongoing. Referring to the IEEE 802.16e standard, the uplink power control is classified into an Open Loop (OL) power control and a Closed Loop (CL) power control. The OL power control is a scheme that a Mobile Station (MS) estimates a downlink path loss and determines uplink power under an assumption where a path loss at an uplink channel and a path loss at a downlink channel are identical. The CL power control is a scheme where a BS controls uplink power of an MS.

Although the IEEE 802.16e standard defines the OL power control and the CL power control, the power control is applied to data transmission. However, a signal for uplink channel estimation, i.e., a sounding signal, pilot signals, a preamble signal and the like, is not defined. In other words, the IEEE 802.16e standard states a plurality of required CINR values for each Modulation and Coding Scheme (MCS) level regarding the data transmission, but states only a single CINR value for the sounding signal as shown in Table 1 below.

TABLE 1

| Modulation/FEC rate | Normalized C/N |
|---|---|
| Sounding transmission | 9 |

As aforementioned, only one CINR value is stated for the sounding signal. In consequence, a uniform target CINR value is required to transmit the sounding signal without reference to a status of an MS, i.e., a location, a channel condition and the like. Therefore, noise and interference levels are increased in the overall communication system.

Therefore a need exists for an apparatus and method for controlling power of an uplink sounding signal in a wireless communication system in order to decrease the level of noise and interference.

SUMMARY OF THE INVENTION

An aspect of the present invention is to address at least the above-mentioned problems and/or disadvantages and to provide at least the advantages described below. Accordingly, an aspect of the present invention is to provide an apparatus and method for controlling power of a signal for uplink channel estimation.

Another aspect of the present invention is to provide an apparatus and method for controlling power of an uplink sounding signal.

A further aspect of the present invention is to provide an apparatus and method for controlling power of an uplink sounding signal with information regarding multiple target Carrier to Interference and Noise Ratios (CINRs).

Yet another aspect of the present invention is to provide an apparatus and method for controlling power of an uplink sounding signal with different target CINRs.

Still another aspect of the present invention is to provide an apparatus and method for performing open loop power control on an uplink sounding signal.

Another aspect of the present invention is to provide an apparatus and method for performing closed loop power control on an uplink sounding signal.

In accordance with an aspect of the present invention, a method for an operation of a Mobile Station (MS) in a wireless communication system is provided. The method includes estimating a downlink CINR using at least one signal received from a Base Station (BS), determining a transmit power level for a sounding signal using a target CINR for the sounding signal, wherein the target CINR is determined based on the downlink CINR and multi-target CINR information, and transmitting the sounding signal according to the transmit power level.

In accordance with another aspect of the present invention, a method for an operation of a BS in a wireless communication system is provided. The method includes estimating Noise and Interference (NI) of a sounding region, generating a first message including multi-target CINR information for a sounding signal and a second message including information regarding the NI of the sounding region, transmitting the first message and the second message to an MS, and receiving the sounding signal from the MS.

In accordance with a further aspect of the present invention, a method for an operation of a BS in a wireless communication system is provided. The method includes determining a target CINR for a sounding signal using downlink CINR and multi-target CINR information, estimating NI of a sounding region, generating a first message including the target CINR and a second message including information regarding the NI of the sounding region, transmitting the first message and the second message to an MS, and receiving the sounding signal from the MS.

In accordance with yet another aspect of the present invention, an apparatus for an MS in a wireless communication system is provided. The apparatus includes an estimator for estimating a downlink CINR using at least one signal received from a BS, a calculator for determining a transmit power level for a sounding signal using a target CINR for the sounding signal, wherein the target CINR is determined based on the downlink CINR and multi-target CINR information, and a transmitter for transmitting the sounding signal according to the transmit power level.

In accordance with another aspect of the present invention, an apparatus for a BS in a wireless communication system is provided. The apparatus includes an estimator for estimating NI of a sounding region, a processor for generating a first message including multi-target CINR information for a sounding signal and a second message including information regarding the NI of the sounding region, a transmit modem for transmitting the first message and the second message to an MS, and a receive modem for receiving the sounding signal from the MS.

In accordance with still another aspect of the present invention, an apparatus for a BS in a wireless communication system is provided. The apparatus includes an estimator for estimating NI of a sounding region, a processor for determining a target CINR for a sounding signal using downlink CINR and multi-target CINR information, and for generating a first message including the target CINR and a second message including information regarding the NI of the sounding region, a transmit modem for transmitting the first message and the second message to an MS, and a receive modem for receiving the sounding signal from the MS.

Other aspects, advantages and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments the present invention will become more apparent from the following description taken in conjunction with the accompanying drawings, in which.

Throughout the drawings, like reference numerals will be understood to refer to like parts, components and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Hereinafter, exemplary embodiments of the present invention provide a technique for controlling power of an uplink sounding signal with different target Carrier to Interference and Noise Ratios (CINRs) in a broadband wireless communication system.

In an exemplary implementation, a signal that is transmitted through a predefined resource to estimate an uplink channel includes a sounding signal, a pilot signal, a preamble signal, a midamble signal, a postamble signal, and the like. Hereinafter, it is assumed that the signal for uplink channel estimation is the sounding signal.

In an exemplary implementation, a required target received signal strength value includes Carrier to Interference and Noise Ratio (CINR), Signal to Noise Ratio (SNR), Signal to Interference and Noise Ratio (SINR), Received Signal Strength Indicator (RSSI), Carrier to Interference (C/I), Carrier to Noise Ratio (CNR), and the like. Hereinafter, it is assumed that the required target received signal strength value is the CINR.

Although an Orthogonal Frequency Division Multiplexing (OFDM)/Orthogonal Frequency Division Multiple Access (OFDMA)-based wireless communication system is described hereinafter, for example, exemplary embodiments of the present invention may also equally apply to other types of wireless communication system.

In a broadband wireless communication system, an uplink transmit power level according to Open Loop (OL) power control is represented as Equation 1.

$$P(dBm)=L+C/N+NI-10\log_{10}(R)+\text{Offset\_SS}_{perSS}+\text{Offset\_BS}_{perSS} \quad (1)$$

In Equation 1, P denotes a transmit power level per user on current transmission, L denotes an estimated average current uplink propagation loss, C/N denotes a normalized Carrier to Noise on current transmission, NI denotes an average power level [dBm] of noise and interference per user estimated by a Base Station (BS), R denotes the number of repetitions according to a Modulation and Coding Scheme (MCS) level, Offset_SSperSS denotes a correction term for Mobile Station (MS)-specific power offset and is controlled by an MS, and Offset_BSperSS denotes a correction term for the MS-specific power offset and is controlled by the BS.

Hereinafter, power control for a sounding signal using Equation 1 will be described.

In Equation 1, it is assumed that a second term, C/N, is deemed as a target CINR and a fourth term, 10 log 10(R), is not considered to transmit the sounding signal. To reduce total interference level of the system, one of different target CINRs corresponding to a current downlink CINR may be allocated to the sounding signal. For example, assuming that cell geometry is classified in four regions by the downlink CINR, multi-target CINR values are defined in Table 2 below.

TABLE 2

| DownLink (DL) CINR range | Target CINR |
|---|---|
| DL CINR < Th1 | CINR 1 |
| Th1 < DL CINR < Th2 | CINR 2 |
| Th2 < DL CINR < Th3 | CINR 3 |
| Th3 < DL CINR | CINR 4 |

In Table 2, Th1<Th2<Th3 and CINR1<CINR2<CINR3<CINR4. According to Table 2, an MS at a center of a cell uses a higher target CINR and an MS at an edge of the cell uses a lower target CINR.

In an exemplary implementation, information regarding a mapping rule between downlink CINRs and target CINRs may be transmitted to an MS from a BS via a message. When the BS and MS share the information regarding the mapping rule, the BS merely determines a target CINR and notifies the target CINR to the MS.

In an exemplary implementation, the information regarding the mapping rule is predefined or is stored originally at the MS since the information regarding the mapping rule is defined based on a system standard. In this case, the BS does not have to expressly transmit the information regarding the mapping rule to the MS.

If the C/N in Equation 1 is deemed to be a target CNR, an uplink transmit power level according to OL power control is represented as Equation 2. Since a repetition coding is not applied, that is, the fourth term of Equation 1 is not considered when transmitting the sounding signal, the uplink transmit power level when using the target CNR is determined as Equation 2.

$$P(dBm)=L+C/N+N+\text{Offset\_SS}_{perSS}+\text{Offset\_BS}_{perSS} \quad (2)$$

In Equation 2, P denotes a transmit power level per user on current transmission, L denotes an estimated average current uplink propagation loss, C/N denotes a normalized Carrier to Noise on current transmission, N denotes an average power level of noise, Offset_SSperSS denotes a correction term for Mobile Station (MS)-specific power offset and is controlled by an MS, and Offset_BSperSS denotes a correction term for the MS-specific power offset and is controlled by a BS.

Assuming that an average power level of noise at an uplink channel and an average power level of noise at a downlink channel are identical, the MS may determine the N by itself without receiving the N from the BS.

Figure 1:
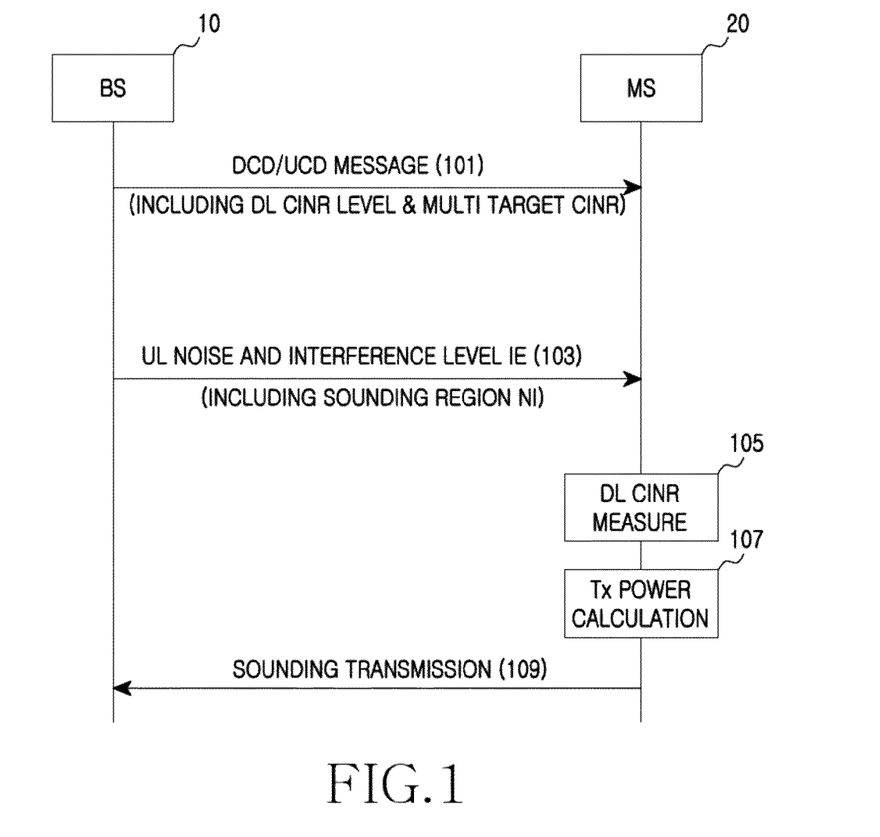
FIG. 1 illustrates a signaling procedure between a Mobile Station (MS) and a Base Station (BS) in a broadband wireless communication system according to an exemplary embodiment of the present invention.

FIG. 1 illustrates a signaling procedure between an MS and a BS in a broadband wireless communication system according to an exemplary embodiment of the present invention.

Referring to FIG. 1, the BS 10 transmits a message including information regarding a multi-target CINR corresponding to a downlink CINR to the MS 20 in step 101. For example, the message may be a Downlink Channel Descriptor/Uplink Channel Descriptor (DCD/UCD) message for broadcasting system information.

The BS 10 then transmits a message including a Noise and Interference (NI) value of a sounding region to the MS 20 in step 103. For example, the message may be an uplink NI level Information Element (IE).

The MS 20 receiving the messages estimates a downlink CINR using a frame preamble signal in step 105. The MS 20 determines a transmit power for a sounding signal using a target CINR corresponding to the estimated downlink CINR and the NI of the sounding region as Equation 1 in step 107. The MS then transmits the sounding signal according to the determined transmit power to the BS 10 in step 109.

Figure 2:
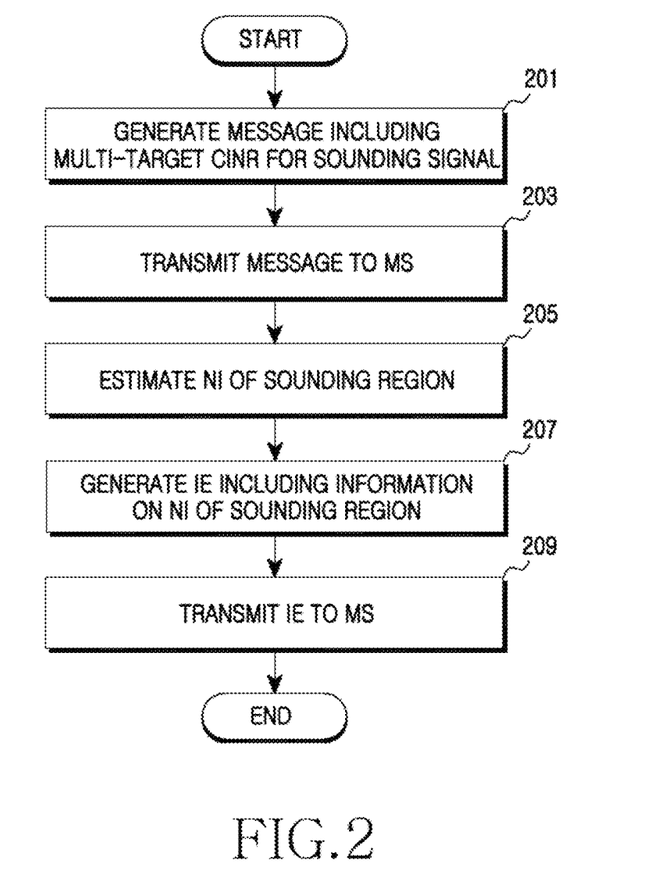
FIG. 2 is a flowchart illustrating an operation of a BS for an Open Loop (OL) power control mode in a broadband wireless communication system according to an exemplary embodiment of the present invention.

FIG. 2 is a flowchart illustrating an operation of a BS for an OL power control mode in a broadband wireless communication system according to an exemplary embodiment of the present invention.

Referring to FIG. 2, the BS generates a message including information regarding a multi-target CINR corresponding to downlink CINRs in step 201. For example, the message may be a DCD/UCD message for broadcasting system information.

The BS transmits the message including the multi-target CINR information to an MS in step 203. When the message is the DCD/UCD message, the multi-target CINR information is broadcasted periodically.

The BS then estimates an NI value of a sounding region in step 205, generates an IE including the NI value of the sounding region in step 207, and transmits the IE to the MS via a control channel, i.e., a map channel in step 209. For example, the IE may be an uplink NI level IE.

In order for the MS to estimate a propagation loss in Equation 1, the MS needs a transmit power of the BS, i.e., BS_Equivalent Isotropically Radiated Power (BS_EIRP) value. The BS_EIRP value may be included in the DCD/UCD message. If a sixth term, Offset_BSperss, of Equation 1 is considered to perform the power control for the sounding signal, the MS may acquire the Offset_BSperss using messages related with power control, i.e., power control mode change response (PCM_RSP) message, fast power control message, power control IE, uplink map fast tracking IE and the like, that are received from the BS.

Figure 3:
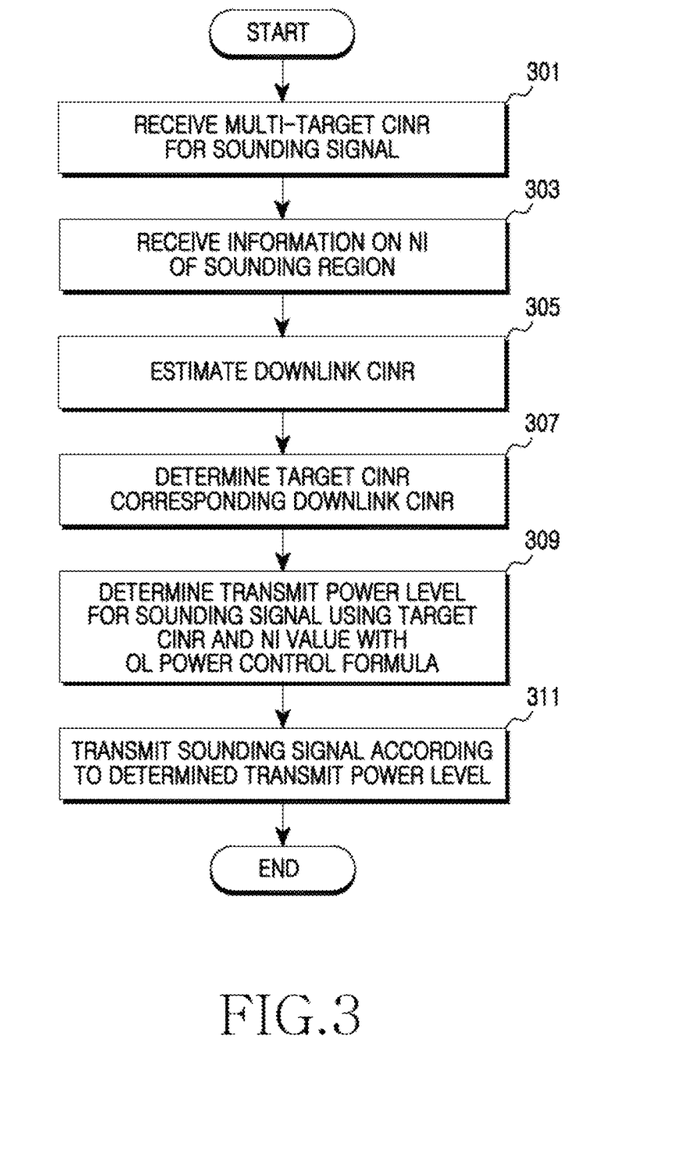
FIG. 3 is a flowchart illustrating an operation of an MS for an OL power control mode in a broadband wireless communication system according to an exemplary embodiment of the present invention.

FIG. 3 is a flowchart illustrating an operation of an MS for an OL power control mode in a broadband wireless communication system according to an exemplary embodiment of the present invention.

Referring to FIG. 3, the MS receives a message including information regarding a multi-target CINR for a sounding signal in step 301. The message includes information regarding the multi-target CINR corresponding to downlink CINRs. For example, the message may be a DCD/UCD message for broadcasting system information.

The MS then receives a message including an NI value of a sounding region via a control channel, i.e., a map channel, in step 303. For example, the message may be an uplink NI level IE.

The MS estimates a downlink CINR using a certain signal from a BS, i.e., a preamble signal, in step 305. The MS then determines a target CINR corresponding to the estimated downlink CINR using the multi-target CINR information in step 307.

The MS determines a transmit power level for a sounding signal using the target CINR and the NI value with an OL power control formula as Equation 1 in step 309. To use Equation 1, the MS needs to estimate a propagation loss and may estimate the propagation loss by using a total received power of a frame preamble and a BS_EIRP value from the DCD/UCD message. If a fifth term, Offset_SSperss, of Equation 1 is considered, the MS may determine the Offset_SSperss using a predefined formula. Additionally, If a sixth term, Offset_BSperss, of Equation 1 is considered, the MS may acquire the Offset_BSperss using messages related with power control, i.e., power control mode change response (PCM_RSP) message, fast power control message, power control IE, uplink map fast tracking IE and the like, that are received from the BS.

After determining the transmit power level for the sounding signal, the MS transmits the sounding signal according to the determined transmit power level to the BS in step 311.

When an MS initially transmits a sounding signal, the MS operates in an OL power control mode controlling a transmit power for the sounding signal as aforementioned. However, the MS may change to a Closed Loop (CL) power control mode after initial transmission. Hereinafter, a power control for the sounding signal in the CL power control mode will be described.

Figure 4:
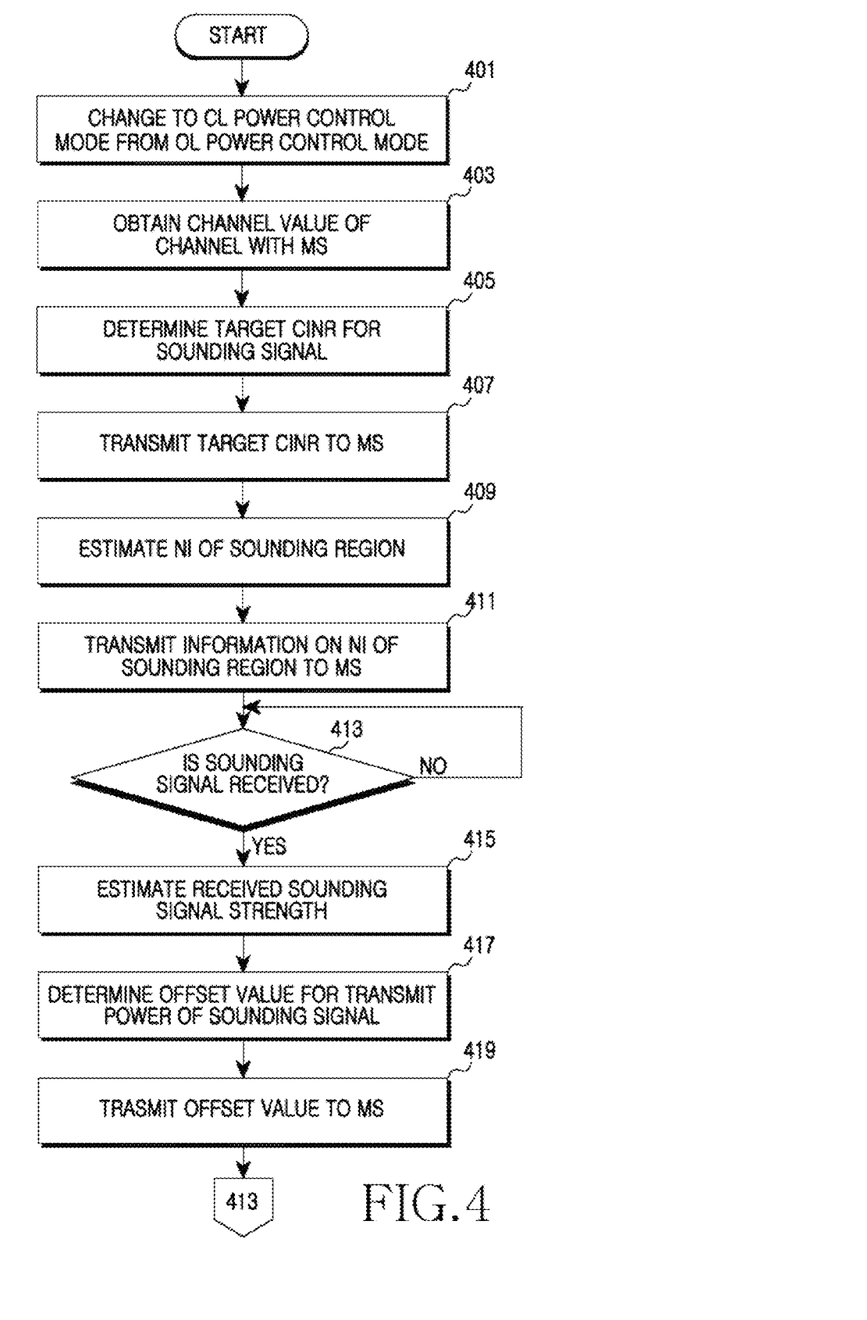
FIG. 4 is a flowchart illustrating an operation of a BS for a Closed Loop (CL) power control mode in a broadband wireless communication system according to an exemplary embodiment of the present invention.

FIG. 4 is a flowchart illustrating an operation of a BS for a CL power control mode in a broadband wireless communication system according to an exemplary embodiment of the present invention.

Referring to FIG. 4, the BS changes to the CL power control mode from an OL power control mode upon occurrence of a certain event or a certain condition in step 401. In an exemplary implementation, the certain event or the certain condition may be defined variously.

After changing to the CL power control mode, the BS obtains a channel value of a channel with a MS in step 403. For example, the BS may receive information regarding a downlink CINR from the MS or estimate an uplink CINR using a control/data channel received from the MS.

After obtaining the channel value, the BS determines a target CINR for a sounding signal corresponding to geometry of the MS by using the obtained channel value, i.e., the downlink CINR or the uplink CINR in step 405. The BS then transmits a message including information regarding the target CINR to the MS in step 407.

After transmitting the message, the BS estimates an NI value of a sounding region in step 409. The BS then generates an IE including the NI value of the sounding region and transmits the IE to the MS via a control channel, i.e. a map channel in step 411. For example, the IE may be an uplink noise and an interference level IE.

After transmitting the IE, the BS determines whether a sounding signal is received from the MS in step 413. If the sounding signal is received, the BS estimates a received sounding signal strength, i.e., CINR, in step 415. The BS then determines an offset value for a transmit power of the sounding signal by comparing the received strength and the target CINR which is provided to the MS in step 417. When the received strength is greater than the target CINR, the offset value is set to decrease the transmit power of the MS. Whereas, when the received strength is smaller than the target CINR, the offset value is set to increase the transmit power of the MS.

After determining the offset value, the BS transmits a message including the offset value to the MS in step 419. The BS then returns to the step 413, and re-performs step 415 to step 419. Additionally, if the CL power control does not satisfy a transmit power of the MS, the BS may re-determine the target CINR and inform of the target CINR. For example, the target CINR may be transmitted to the MS periodically.

Figure 5:
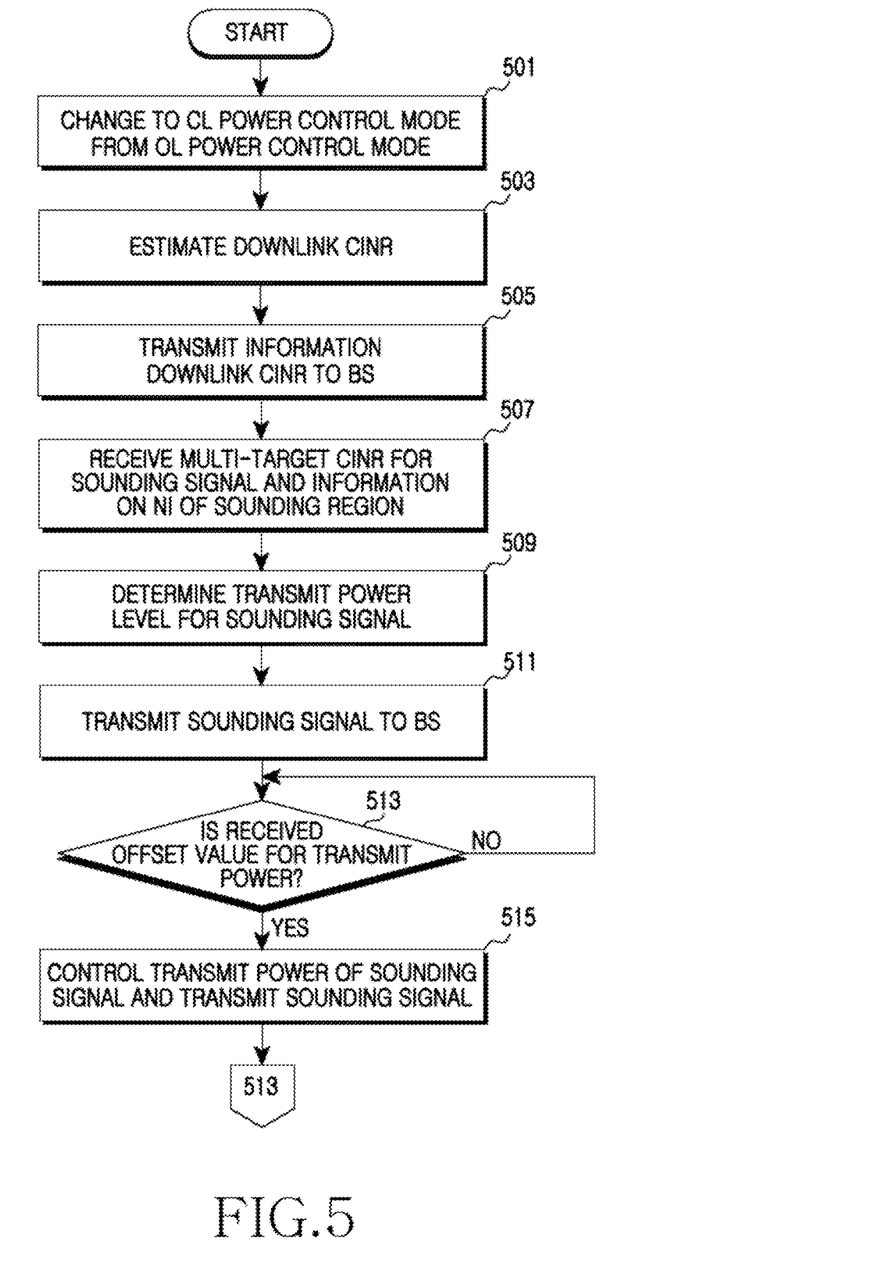
FIG. 5 is a flowchart illustrating an operation of an MS for a CL power control mode in a broadband wireless communication system according to an exemplary embodiment of the present invention.

FIG. 5 is a flowchart illustrating an operation of an MS for a CL power control mode in a broadband wireless communication system according to an exemplary embodiment of the present invention.

Referring to FIG. 5, the MS changes to the CL power control mode from an OL power control mode upon occurrence of a certain event or a certain condition in step 501. In an exemplary implementation, the certain event or the certain condition may be defined variously.

After changing to the CL power control mode, the MS estimates a downlink CINR using a certain signal received from a BS, i.e. a preamble signal, in step 503. The MS then transmits the downlink CINR to the BS in step 505. For example, the downlink CINR is fed back to the BS via a Channel Quality Indicator Channel (CQICH).

After transmitting the downlink CINR, the MS receives information regarding a target CINR for a sounding signal and an NI value of a sounding region from the BS in step 507. The target CINR and the NI value may be defined as an IE in a map message. For example, the NI value of the sounding region may be received via an uplink noise and an interference level IE.

After receiving the target CINR and the NI value, the MS determines a transmit power level for the sounding signal using the target CINR and the NI value in step 509. For example, the MS determines the transmit power level according to Equation 1. The MS then transmits the sounding signal according to the transmit power level to the BS in step 511.

After transmitting the sounding signal, the MS determines whether an offset value for a transmit power of the sounding signal is received from the BS in step 513. If the offset value is received, in step 515, the MS controls the transmit power of the sounding signal upon the offset value, transmits the sounding signal according to the controlled transmit power level to the BS, and returns to step 513. When information regarding a new target CINR is received from the BS, the MS re-determines the transmit power level for the sounding signal according to Equation 1.

Figure 6:
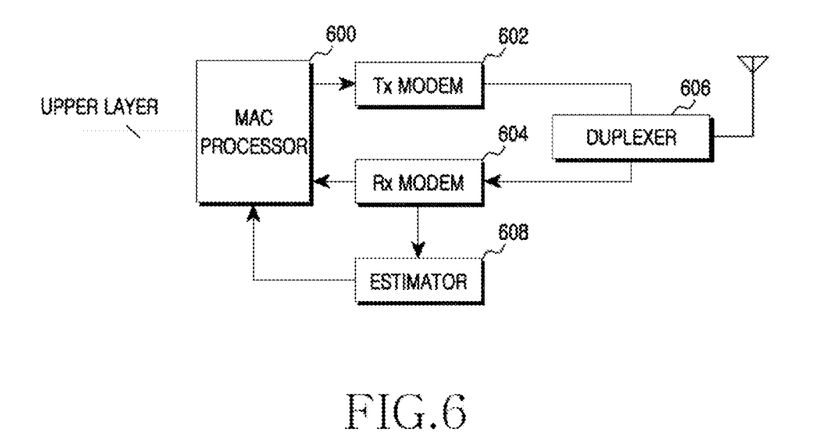
FIG. 6 illustrates a block diagram of a BS in a broadband wireless communication system according to an exemplary embodiment of the present invention.

FIG. 6 illustrates a block diagram of a BS in a broadband wireless communication system according to an exemplary embodiment of the present invention.

Referring to FIG. 6, the BS includes a Media Access Control (MAC) processor 600, a Transmit (TX) modem 602, a Receive (RX) modem 604, a duplexer 606 and an estimator 608.

The MAC processor 600 performs a MAC layer process on a packet from an upper layer and provides the packet to the TX modem 602. Inversely, the MAC processor 600 performs the MAC layer process on a packet from the RX modem 604 and provides the packet to the upper layer. Additionally, the MAC processor 600 generates various MAC management messages and provides the MAC management messages to the TX modem 602. Inversely, the MAC processor 600 analyzes a MAC management message from the RX modem 604 and performs control according the MAC management message.

In order to perform OL power control, the MAC processor 600 generates a message including information regarding a multi-target CINR for a sounding signal and a message including information regarding an NI value of a sounding region. For example, the message including information regarding the multi-target CINR may be a DCD/UCD message and the message including information regarding the NI value of a sounding region may be an uplink noise and an interference level IE. In order for a CL power control, the MAC processor 600 generates a message including a target CINR which is determined based on a channel value, i.e., a downlink CINR or an uplink CINR. Moreover, the MAC processer 600 generates a message including a BS_EIRP value used for an OL power control formula and a message including an Offset_BSperss value.

The TX modem 602 performs a physical layer process on a traffic burst or a packet and a control message burst, and provides the traffic burst or packet and the control message burst to the duplexer 606. For example, the TX modem 602 may perform a channel coding, a baseband modulation, i.e., a code spreading, an OFDM modulation, and the like, and a Radio Frequency (RF) modulation.

The duplexer 606 provides a signal from the TX modem 602 to an antenna and provides a signal from the antenna to the RX modem 604 according to a duplex scheme.

The RX modem 604 performs a physical layer process on a signal from the duplexer 606 and provides the signal to the MAC processer 600. For instance, the RX modem 604 may perform an RF demodulation, a baseband demodulation and a channel decoding. Moreover, the RX modem 604 de-maps a certain signal, i.e., a pilot signal, a sounding signal and the like, and provides the certain signal to the estimator 608.

The estimator 608 estimates an NI value of a sounding region using the certain signal from the RX modem 604 and provides the estimated NI value of the sounding region to the MAC processor 600. The NI value of the sounding region is transmitted to MSs as an uplink noise and interference level IE. Moreover, the estimator 608 receives a sounding signal received via an uplink channel from the RX modem 604, estimates signal strength of the sounding signal, i.e., CINR, and provides the signal strength to the MAC processor 600. Thus, the MAC processer 600 compares the estimated signal strength and the target CINR requested to an MS, determines an offset value for a transmit power of the sounding signal, generates a message including the offset value and provides the message to the TX modem 602.

Figure 7:
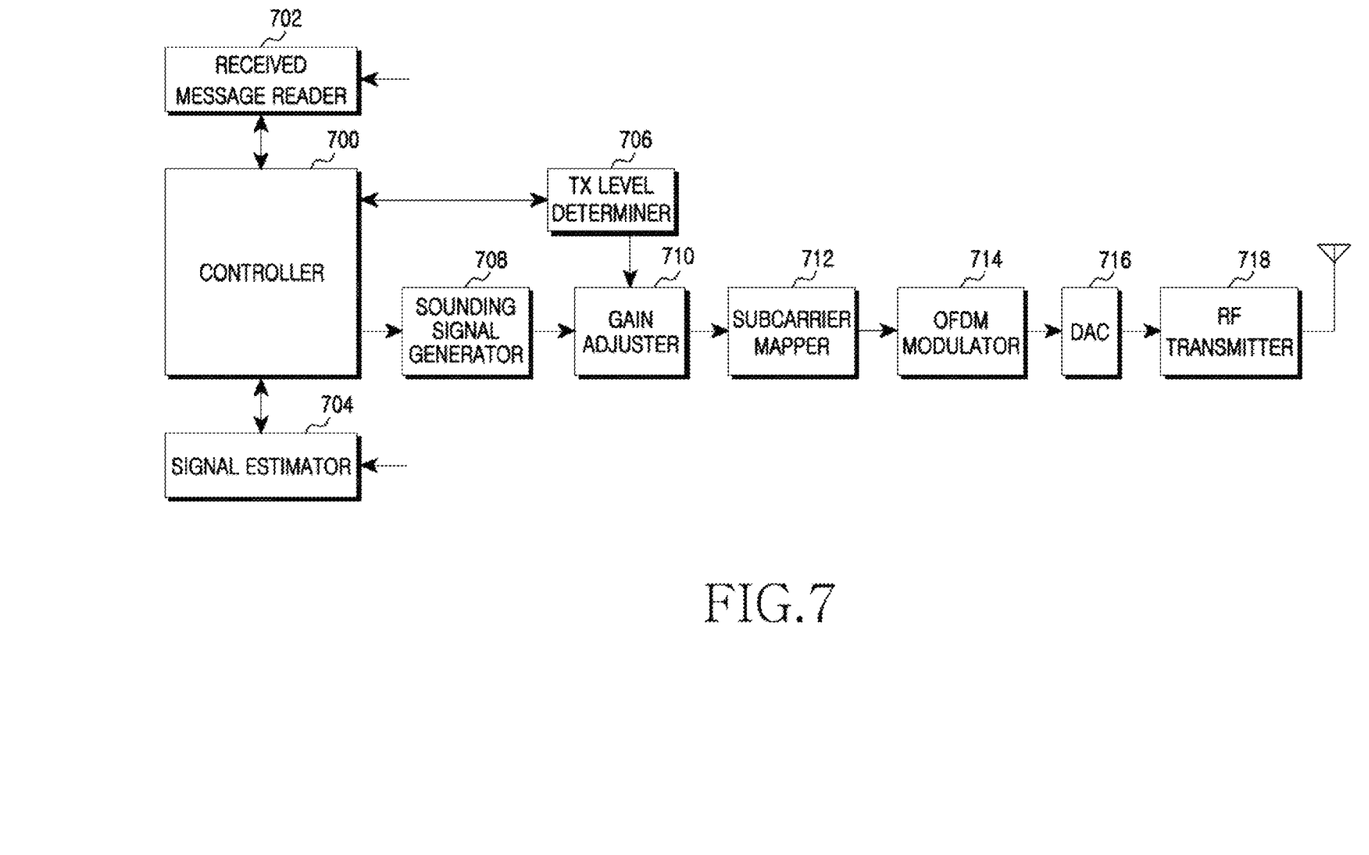
FIG. 7 illustrates a block diagram of an MS in a broadband wireless communication system according to an exemplary embodiment of the present invention.

FIG. 7 illustrates a block diagram of an MS in a broadband wireless communication system according to an exemplary embodiment of the present invention.

Referring to FIG. 7, the MS includes a controller 700, a received message reader 702, a signal estimator 704, a TX level determiner 706, a sounding signal generator 708, a gain adjuster 710, a subcarrier mapper 712, an OFDM modulator 714, a Digital to Analog Converter (DAC) 716 and an RF transmitter 718.

The received message reader 702 analyzes an MAC management message received from a BS and provides an analyzed result to the controller 700. In order to perform OL power control, the received message reader 702 reads information regarding a multi-target CINR for a sounding signal in a DCD/UCD message received from the BS and provides the information to the controller 700. Moreover, the received message reader 702 reads information regarding an NI value of a sounding region in an uplink noise and an interference level IE received from the BS, and provides the information to the controller 700. In order for CL power control, the received message reader 702 reads information regarding a target CINR for the sounding signal in a message received from the BS and provides the message to the controller 700. Moreover, when performing the CL power control for the sounding signal, the received message reader 702 reads an offset value for a transmit power of the sounding signal in a message received from the BS and provides the message to the controller 700.

The signal estimator 704 estimates a total received signal power and a downlink CINR using a frame preamble signal, and provides estimated values to the controller 700. Alternatively, the downlink CINR is fed back to the BS via a CQICH.

The controller 700 controls overall operations to transmit the sounding signal. The controller 700 obtains parameters, i.e., a path loss, a target CINR and the like, that are needed to determine a transmit power level for the sounding signal, and provides the parameters to the TX level determiner 706. When performing the CL power control for the sounding signal, the controller 700 provides the offset value for the transmit power of the sounding signal received from the BS to the TX level determiner 706. For example, the path loss may be determined using the total signal power of the frame preamble and a BS_EIRP value received from the BS. The target CINR may be determined by receiving information on the target CINR from the BS when performing the CL power control, or may be determined using information regarding the multi-target CINR received from the BS when performing the OL power control.

The TX level determiner 706 determines a transmit power level for the sounding signal by using the parameters from the controller 700 with an OL power control formula as Equation 1. The target CINR used in Equation 1 is determined by the MS when performing the OL power control, or is determined by receiving information on the target CINR from the BS when performing the CL power control. When performing the CL power control, the TX level determiner 706 revises a transmit power level of the sounding signal according to the offset value received from the BS. The TX level determiner 706 determines a gain value of the sounding signal according to the transmit power level.

The sounding signal generator 708 generates the sounding signal using a sequence under control of the controller 700. The gain adjuster 710 adjusts a gain of the sounding signal from the sounding signal generator 708 according to a control signal from the TX level determiner 706. Alternatively, the gain adjuster 710 may be located between the subcarrier mapper 712 and the OFDM modulator 714.

The subcarrier mapper 712 maps the gain-controlled sounding signal to a sounding region allocated by the BS. The OFDM modulator 714 converts the sounding signal from the subcarrier mapper 712 into sample data in time domain by using Inverse Fast Fourier Transform (IFFT) and inserts a Cyclic Prefix (CP) into the sample data in time domain. The DAC 716 converts the sample data from the OFDM modulator 714 into an analog signal. The RF transmitter 718 includes a frequency synthesizer and a filter. The RF transmitter 718 converts a baseband signal into an RF-band signal and transmits the RF-band signal through an antenna.

A simulation result to improve performance according to an exemplary embodiment of the present invention will be described below.

A simulation environment is shown in Table 3 and simulation cases are shown in Table 4.

TABLE 3

| Parameter | Assumption |
|---|---|
| Cell configuration | Hexagonal grid, 19 cell sites, 3 sectors per site |
| Path loss model | 37.6009 + 35.0413*$\log_{10}$(R), R in meters |
| Cell radius | 800 m |
| Standard deviation of shadow fading | 8.0 dB |
| Noise figure (DL/UL) | 7.0 dB/4.0 dB |
| Antenna pattern | Tilt on |
| Sounding separability type | Cyclic shift with max shift index P = 18 |
| Sounding symbol | UL one OFDM symbol |
| No. of users per sector | 1, 4 |

TABLE 4

| Case | Target CNR | | | | No. of users per sector |
|---|---|---|---|---|---|
| Conventional 1 (1 user) | 5.0 dB | | | | 1 |
| Conventional 2 (1 user) | 10.0 dB | | | | 1 |
| Proposed (1 user) | DL CINR < 0 dB 4.0 dB | 0 dB < DL CINR < 3 dB 5.23 dB | 3 dB < DL CINR < 6 dB 7.0 dB | 6 dB < DL CINR 10. dB | 1 |
| Conventional 1 (4 user) | 5.0 dB | | | | 4 |
| Conventional 2 (4 user) | 10.0 dB | | | | 4 |
| Proposed (4 user) | DL CINR < 0 dB 2.0 dB | 0 dB < DL CINR < 3 dB 3.23 dB | 3 dB < DL CINR < 6 dB 5.0 dB | 6 dB < DL CINR 8.0 dB | 4 |

Referring to Table 4, two cases where target CINRs are 5.0 dB and 10.0 dB, respectively, are simulated as a conventional technique. In an exemplary implementation, four cases that are classified by downlink CINRs, that is, 0 dB, 3 dB and 6 dB, are simulated. If a user per sector is one, a multi-target CINR is set as 4.0 dB, 5.23 dB, 7.0 dB and 10.0 dB, and if a user per sector is four, a multi-target CINR is set as 2.0 dB, 3.23 dB, 5.0 dB and 8.0 dB.

Figure 8:
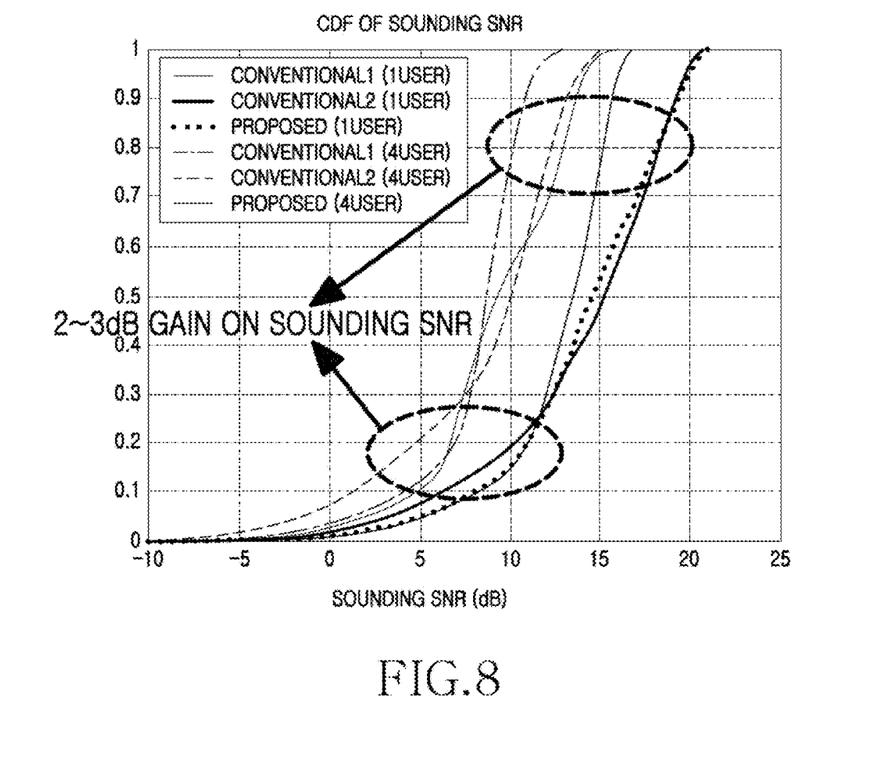
FIG. 8 is a graph illustrating a result of a simulation in a Pedestrian-A (Ped-A) channel according to an exemplary embodiment of the present invention.
Figure 9:
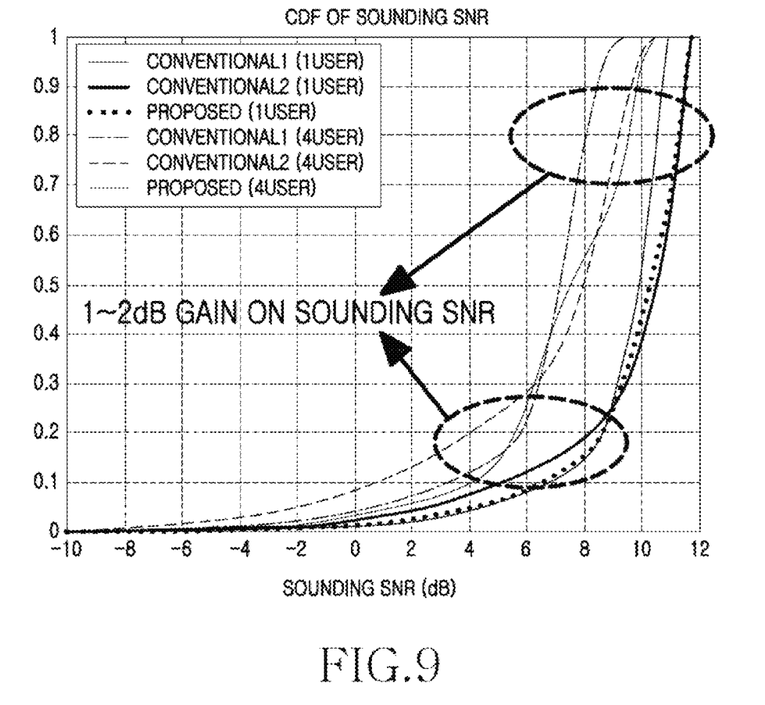
FIG. 9 is a graph illustrating a result of a simulation in a Pedestrian-B (Ped-B) channel according to an exemplary embodiment of the present invention.

FIG. 8 is a graph illustrating results of a simulation in a Pedestrian-A (Ped-A) channel according to an exemplary embodiment of the present invention. FIG. 9 is a graph illustrating results of a simulation in a Pedestrian-B (Ped-B) channel according to an exemplary embodiment of the present invention. As illustrated in FIG. 8 and FIG. 9, the Ped-A channel has a maximum 3 dB gain and the Ped-B channel has a maximum 2 dB gain on a sounding SNR.

As described above, exemplary embodiments of the present invention provide a sounding signal that is able to transmit on an optimal target CINR according to a status of an MS by controlling a transmit power with a multi-target CINR when transmitting the sounding signal for estimating an uplink channel. Additionally, exemplary embodiments of the present invention provide an uplink sounding signal that is able to easily adjust by applying an OL power control and a CL power control to the uplink sounding signal. Accordingly, power control for the sounding signal according to the exemplary embodiment of the present invention provides a higher sounding quality and decreases a total level of noise and interference.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for an operation of a Mobile Station (MS) in a wireless communication system, the method comprising:
    estimating, by the MS, a downlink Carrier to Interference and Noise Ratio (CINR) using at least one signal received from a Base Station (BS);
    determining, by the MS, a transmit power level for an uplink sounding signal using a target CINR for the uplink sounding signal, wherein the target CINR is determined based on the downlink CINR and a multi-target CINR information which comprises a plurality of CINR candidates corresponding to downlink CINR regions; and
    transmitting, by the MS, the uplink sounding signal according to the transmit power level.

2. The method of claim 1, further comprising:
    obtaining information regarding Noise and Interference (NI) of a sounding region through a message received from the BS.

3. The method of claim 2, wherein the transmit power level is determined using the target CINR and the NI of the sounding region.

4. The method of claim 3, wherein the determining of the transmit power level comprises:
    estimating a propagation loss value using total received power of signals from the BS and transmit power of the BS; and
    determining the transmit power level using the propagation loss value, the target CINR and the NI of the sounding region.

5. The method of claim 4, wherein the transmit power level is determined according to the following equation, $$P(dBm) = L + C/N + N + \text{Offset\_SS}_{perSS} + \text{Offset} - \text{BS}_{perSS}$$

wherein, P denotes a transmit power level per user on current transmission, L denotes an estimated average current uplink propagation loss, C/N denotes a normalized Carrier to Noise on current transmission, N denotes an average power level of noise, Offset_SSperSS denotes a correction term for MS-specific power offset and is controlled by the MS, and Offset_BSperSS denotes a correction term for the MS-specific power offset and is controlled by the BS.

6. The method of claim 1, wherein the multi-target CINR information comprises a plurality of target CINRs corresponding to downlink CINR ranges and is at least one of obtained through a message received from the BS and is pre-stored at the MS, and
    wherein the target CINR is determined by the MS.

7. The method of claim 1, wherein the multi-target CINR information comprises a plurality of target CINRs corresponding to downlink CINR ranges, and
    wherein the target CINR is received from the BS.

8. The method of claim 1, further comprising:
feeding back the downlink CINR to the BS after estimating the downlink CINR.

9. The method of claim 1, further comprising:
receiving an offset value for a transmit power of the uplink sounding signal from the BS;
controlling the transmit power level for the uplink sounding signal using the offset value; and
transmitting the uplink sounding signal on the controlled transmit power level.

10. A method for an operation of a Base Station (BS) in a wireless communication system, the method comprising:
estimating, by the BS, Noise and Interference (NI) of a sounding region;
generating, by the BS, a first message including a multi-target Carrier to Interference and Noise Ratio (CINR) information for an uplink sounding signal and a second message including information regarding the NI of the sounding region;
transmitting, by the BS, the first message and the second message to a Mobile Station (MS); and
receiving by the BS, the uplink sounding signal from the MS.

11. The method of claim 10, wherein the multi-target CINR information comprises a plurality of target CINRs corresponding to downlink CINR ranges.

12. A method for an operation of a Base Station (BS) in a wireless communication system, the method comprising:
determining, by the BS, a target Carrier to Interference and Noise Ratio (CINR) for an uplink sounding signal using downlink CINR and multi-target CINR information;
estimating, by the BS, Noise and Interference (NI) of a sounding region;
generating, by the BS, a first message including the target CINR and a second message including information regarding the NI of the sounding region;
transmitting, by the BS, the first message and the second message to a Mobile Station (MS); and
receiving, by the BS, the uplink sounding signal from the MS.

13. The method of claim 12, wherein the multi-target CINR information comprises a plurality of target CINRs corresponding to downlink CINR ranges.

14. The method of claim 13, further comprising:
estimating a received sounding signal strength;
determining an offset value for a transmit power of the uplink sounding signal by comparing the received sounding signal strength and the target CINR; and
transmitting a third message including the offset value to the MS.

15. The method of claim 14, wherein the downlink CINR comprises one of a downlink CINR fed back from the MS and an uplink CINR estimated using a signal from the MS.

16. An apparatus for a Mobile Station (MS) in a wireless communication system, the apparatus comprising:
an estimator for estimating a downlink Carrier to Interference and Noise Ratio (CINR) using at least one signal received from a Base Station (BS);
a calculator for determining a transmit power level for an uplink sounding signal using a target CINR for the uplink sounding signal, wherein the target CINR is determined based on the downlink CINR and multi-target CINR information which comprises a plurality of CINR candidates corresponding to downlink CINR regions; and a transmitter for transmitting the uplink sounding signal according to the transmit power level.

17. The apparatus of claim 16, further comprising:
a reader for obtaining information regarding Noise and Interference (NI) of a sounding region through a message received from the BS.

18. The apparatus of claim 17, wherein the transmit power level is determined using the target CINR and the NI of the sounding region.

19. The apparatus of claim 18, further comprising:
a controller for estimating a propagation loss value using total received power of signals from the BS and transmit power of the BS,
wherein the calculator determines the transmit power level using the propagation loss value, the target CINR and the NI of the sounding region.

20. The apparatus of claim 19, wherein the transmit power level is determined according to the following equation, $$P(dBm) = L + C/N + N + \text{Offset}\_{SSperSS} + \text{Offset}\_{BSperss}$$

wherein, P denotes a transmit power level per user on current transmission, L denotes an estimated average current uplink propagation loss, C/N denotes a normalized Current to Noise on current transmission, N denotes an average power level of noise, Offset_SSperSS denotes a correction term for Mobile Station (MS)-specific power offset and is controlled by the MS, and Offset_BSperSS denotes a correction term for the MS-specific power offset and is controlled by the BS.

21. The apparatus of claim 16, wherein the multi-target CINR information comprises a plurality of target CINRs corresponding to downlink CINR ranges, and is at least one of obtained through a message received from the BS and is pre-stored at the MS, and
wherein the target CINR is determined by the MS.

22. The apparatus of claim 16, wherein the multi-target CINR information comprises a plurality of target CINRs corresponding to downlink CINR ranges, and
wherein the target CINR is received from the BS.

23. The apparatus of claim 16, wherein the controller feeds back the downlink CINR to the BS after estimating the downlink CINR.

24. The apparatus of claim 16, wherein the reader obtains an offset value for a transmit power of the uplink sounding signal through a message received from the BS,
the calculator controls the transmit power level for the uplink sounding signal using the offset value, and
the transmitter transmits the uplink sounding signal according to the controlled transmit power level.

25. An apparatus for a Base Station (BS) in a wireless communication system, the apparatus comprising:
an estimator for estimating Noise and Interference (NI) of a sounding region;
a processor for generating a first message including multi-target Carrier to Interference and Noise Ratio (CINR) information for an uplink sounding signal and a second message including information regarding the NI of the sounding region;
a transmit modem for transmitting the first message and the second message to a Mobile Station (MS); and
a receive modem for receiving the uplink sounding signal from the MS.

26. The apparatus of claim 25, wherein the multi-target CINR information comprises a plurality of target CINRs corresponding to downlink CINR ranges.

27. An apparatus for a Base Station (BS) in a wireless communication system, the apparatus comprising:

an estimator for estimating Noise and Interference (NI) of a sounding region;

a processor for determining a target Carrier to Interference and Noise Ratio (CINR) for an uplink sounding signal using downlink CINR and multi-target CINR information, and for generating a first message including the target CINR and a second message including information regarding the NI of the sounding region;

a transmit modem for transmitting the first message and the second message to a Mobile Station (MS); and a receive modem for receiving the uplink sounding signal from the MS.

28. The apparatus of claim 27, wherein the multi-target CINR information comprises a plurality of target CINRs corresponding to downlink CINR ranges.

29. The apparatus of claim 28, wherein the estimator estimates a received sounding signal strength, the processor determines an offset value for a transmit power of the uplink sounding signal by comparing the received sounding signal strength and the target CINR, and the transmit modem transmits a third message including the offset value to the MS.

30. The apparatus of claim 29, wherein the downlink CINR comprises one of a downlink CINR fed back from the MS and an uplink CINR estimated using a signal from the MS.

* * * * *